(12) United States Patent
Ireland et al.

(10) Patent No.: US 9,686,093 B2
(45) Date of Patent: Jun. 20, 2017

(54) METHOD FOR DETERMINING AN OPTIMAL SCHEDULE OF AN APPLIANCE

(71) Applicant: Whirlpool Corporation, Benton Harbor, MI (US)

(72) Inventors: Vincent A. Ireland, Saint Joseph, MI (US); Michael J. Jakeway, Bridgman, MI (US); Aaron J. Oosterbaan, Cornelius, NC (US)

(73) Assignee: Whirlpool Corporation, Benton Harbor, MI (US)

( * ) Notice: Subject to any disclaimer, the term of this patent is extended or adjusted under 35 U.S.C. 154(b) by 822 days.

(21) Appl. No.: 14/022,575

(22) Filed: Sep. 10, 2013

(65) Prior Publication Data

US 2015/0073612 A1    Mar. 12, 2015

(51) Int. Cl.
*H04L 12/28* (2006.01)
*H02J 3/00* (2006.01)

(52) U.S. Cl.
CPC ...... *H04L 12/2816* (2013.01); *H04L 12/2834* (2013.01); *H02J 3/008* (2013.01); *H04L 2012/285* (2013.01); *Y02B 70/325* (2013.01); *Y04S 20/228* (2013.01); *Y04S 50/10* (2013.01)

(58) Field of Classification Search
USPC .................................................. 700/295, 291
See application file for complete search history.

(56) References Cited

U.S. PATENT DOCUMENTS

| | | | |
|---|---|---|---|
| 6,480,803 B1 | 11/2002 | Pierret et al. | |
| 7,516,106 B2 | 4/2009 | Ehlers et al. | |
| 7,783,390 B2 * | 8/2010 | Miller | G06Q 50/06 700/286 |
| 7,949,615 B2 | 5/2011 | Ehlers et al. | |
| 8,019,697 B2 | 9/2011 | Ozog | |
| 8,041,467 B2 | 10/2011 | Black et al. | |
| 8,818,566 B2 * | 8/2014 | Besore | H02J 3/14 700/291 |
| 2005/0033707 A1 | 2/2005 | Ehlers et al. | |
| 2010/0179704 A1 | 7/2010 | Ozog | |
| 2010/0222934 A1 | 9/2010 | Iino et al. | |
| 2011/0153101 A1 * | 6/2011 | Thomas | G06Q 10/04 700/291 |
| 2011/0231028 A1 | 9/2011 | Ozog | |
| 2011/0264290 A1 * | 10/2011 | Drew | G05D 23/1923 700/291 |

(Continued)

OTHER PUBLICATIONS

Zareipour et al., "Application of Public-Domain Market Information to Forecast Ontario's Wholesale Electricity Prices", Nov. 2006, IEEE transactions on Power Systems, vol. 21 No. 4, pp. 1707-1717.*

*Primary Examiner* — Jason Lin

(57) ABSTRACT

A method of defining a message to be sent to at least one appliance regarding a schedule for performing a cycle of operation includes a step of acquiring pricing data from a source of information about a resource consumed by the appliance. A projected rate for the use of the resource by the appliance for a future series of time periods is calculated based upon a user preference. A projected schedule for performing the cycle of operation for a future series of time periods is created and then incorporated into the message that is transmitted to the appliance.

17 Claims, 4 Drawing Sheets

(56) References Cited

U.S. PATENT DOCUMENTS

| | | | | |
|---|---|---|---|---|
| 2011/0270452 A1* | 11/2011 | Lu | ................... | G05B 19/042 |
| | | | | 700/291 |
| 2012/0136499 A1* | 5/2012 | Jang | ................... | G06Q 50/06 |
| | | | | 700/297 |
| 2013/0144451 A1* | 6/2013 | Kumar | ................... | G05B 13/02 |
| | | | | 700/291 |
| 2014/0129040 A1* | 5/2014 | Emadi | ................... | G06Q 50/06 |
| | | | | 700/291 |
| 2014/0277769 A1* | 9/2014 | Matsuoka | ................... | G06Q 50/06 |
| | | | | 700/278 |

* cited by examiner

METHOD FOR DETERMINING AN OPTIMAL SCHEDULE OF AN APPLIANCE

BACKGROUND

Home appliances use energy to perform cycles of operation, and users are increasingly interested in energy efficient home appliances that reduce the amount of energy an appliance uses to decrease energy costs. Enabling the user to manage energy use in appliances benefits not only the user, but also the utility suppliers who must respond to peak demands with minimal disruption to the supply. Previous energy management solutions enable users to select more energy efficient cycles, to delay appliance use until energy cost or demand is low, and to shut down or pause an appliance cycle in progress if energy cost/demand becomes high.

BRIEF DESCRIPTION

In one aspect, a method of defining a message to be sent to at least one appliance regarding a schedule for performing a cycle of operation is provided. The method includes acquiring pricing data from a source of information about a resource consumed by the appliance while performing the cycle of operation; obtaining a user preference for a factor associated with the use of the resource by the appliance; calculating a projected rate for the use of the resource by the appliance for a future series of time periods; assigning a delay request to selected time periods based on the factor; creating a projected schedule for performing the cycle of operation for the future series of time periods incorporating the projected schedule into the message; and transmitting to the appliance the message.

In another aspect, a method of determining an optimal schedule for performing a cycle of operation in an appliance wherein the schedule is a function of the cost or availability of a resource consumed by the appliance while performing the cycle of operation is provided. The method further comprises obtaining from a user of the appliance a factor between 0 and 1 based on the user's preference for a level of participation in management of the resource and determining the optimal schedule based on the factor.

DETAILED DESCRIPTION

Figure 1:
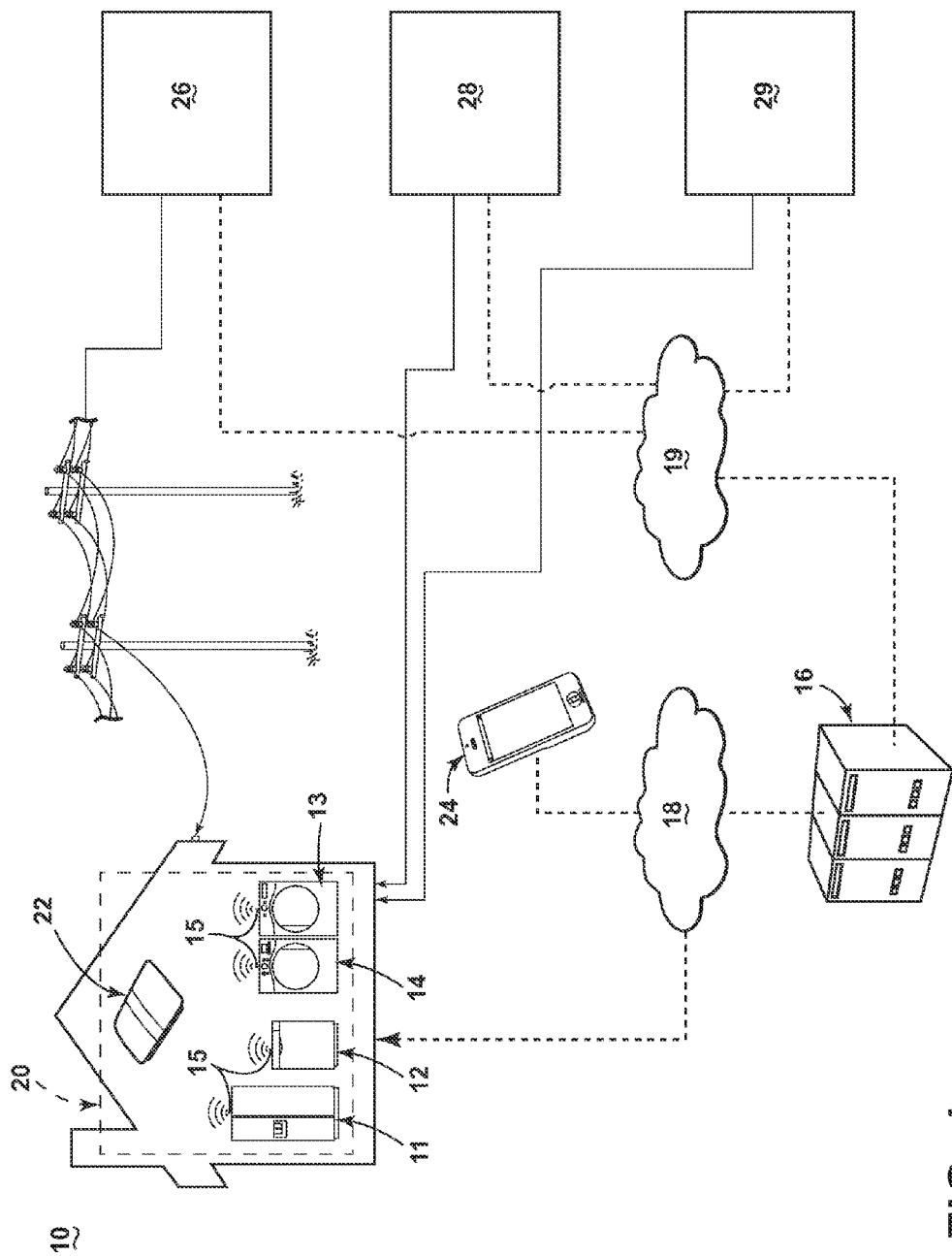
FIG. 1 is a schematic view of a system for transmitting a message regarding a schedule for performing a cycle of operation of an appliance according to one embodiment of the invention.

FIG. 1 is a schematic view of a system 10 according to one embodiment of the invention. The system 10 includes at least one appliance 11, 12, 13, 14 in communication with a remote device 16 via at least one communication network 18, such as the Internet. Optionally, the appliance(s) 11, 12, 13, 14 can be part of a home network or home area network (HAN) 20 for communication with other devices within a home. A router 22 can be provided for forwarding data between the appliance(s) 11, 12, 13, 14 and the communication network 18. A user display 24 in a mobile device (as illustrated) or elsewhere on the appliance(s) 11, 12, 13, 14 can also be provided for showing system information to a user about aspects of the system 10 including an optimal schedule for performing a cycle of operation.

The appliance(s) 11, 12, 13, 14 of the system 10 may be a home or domestic appliance that performs a particular job in a home, including those relating to cleaning, cooking, or food preservation. The home appliance, for example in the case of a dishwasher 12, may include a housing at least partially defining a treating chamber (not shown) and having an open face selectively closed by a cover, shown herein as a door, for providing access to the treating chamber. The treating chamber can receive one or more article(s), and the appliance 12 may treat the article(s) according to a useful cycle of operation. Again, in the case of a dishwasher 12, the treating chamber can receive one or more dish(es), and the dishwasher 12 can perform a cleaning system on the dish(es) in the treating chamber. Other types of appliances, including, but not limited to a refrigerator 11, a clothes washing machine 13, a clothes dryer 14, a freezer, a range, a stove, an oven, or a cooktop may be used with the system 10. All of these examples of home appliances can receive one or more article(s), and can perform a useful cycle of operation on the article(s). Other examples of appliance types typically found within a home and which may be used with the system include an air conditioner, a water heater, and a pool pump.

While four appliances 11, 12, 13, 14 are shown in FIG. 1, it should be understood that the system 10 can include any number of appliances including more or less than four. The appliances can be located within a single home or at a common location, and some or all may be part of the HAN 20.

A receiver 15 can be used to connect each appliance 11, 12, 13, 14 to the HAN 20, and may be a separate or an external device or it may be carried by or, as shown in FIG. 1, built into the appliances 11, 12, 13, 14. The receiver 15 can communicate with the appliance by a wireless or wired connection. The receiver 15 is associated with the appliance for receiving signals sent via the communication network 18. The receiver 15 can also have a transmitter, whereby signals from the appliance can be transmitted to the communication network 18 by the receiver 15 wirelessly.

The remote device 16 can communicate information with and/or respond to requests from the appliance(s) 11, 12, 13, 14 from a remote location, typically outside of the home or HAN 20. The remote device 16 can include a data storage unit for storing data, such as historical usage or operational data for the appliance(s) 11, 12, 13, 14 based on information from the receiver 15.

The remote device 16 may comprise one or more servers which manages the appliance's access to a centralized resource or service. For example, the remote device 16 may be a server of a utility provider 26, 28, 29, and may communicate demand information, such as if the utility were experiencing a high or critical demand, or pricing information, such as the present or future cost of energy. In another example, the remote device 16 may be a server of a manufacturer of the appliance 12 or some other third-party, and may communicate energy information similar to that from a utility provider 26, 28, 29. While only one remote device 16 is shown in FIG. 1, it should be understood that the system 10 may include multiple remote devices 16. The remote device 16 may communicate with one or more utility providers 26, 28, 29 via the communication network 19 and, in the case where the communications networks 18, 19 are the Internet, may be the same communication network.

The communication network 18 may be a private or public network, and may typically be a WAN (wide area network) such as the Internet. Similarly the HAN 20 may be a private or public network, and may typically be a LAN (local area network). The router 22 forwards data between the communication network 18 and the HAN 20. The HAN 20 may have a different communication protocol than the communication network 18, in which case the router 22 or another device (not shown) can translate the data sent between the communication network 18 and the HAN 20 between the different communication protocols. The router 22 can be a separate device in the HAN 20, or it can be built into one of the appliances 11, 12, 13, 14.

The user display 24 can provide users with access and control of the appliance(s) 11, 12, 13, 14 and/or the HAN 20. Through the user display 24, a user can monitor and control resource consumption by the appliance(s) 11, 12, 13, 14. The user display 24 may, for example, comprise a smartphone, a tablet computer, a desktop computer, and a notebook computer. While not shown in FIG. 1, the user display 24 may be coupled with the HAN 20.

Appliances consume resources received from utility provider 26, 28, 29. Typical resources include electricity, gas and water. The cost of the resources fluctuates, sometimes depending on whether there is a high demand for a particular resource during a certain time period. Previous resource management solutions have attempted to control appliances based on the fluctuating cost or demand. When a cycle of operation is in progress or about to begin, previous resource management solutions have permitted the cycle to be paused, delayed, and/or scheduled.

Appliances use varying amounts of resources while performing a cycle of operation; some activities within a cycle consume more resources than others. For example, one resource intensive activity performed by appliances such as dishwashers and clothes washers is heating water. Other non-limiting examples of resource intensive operations include making ice in a refrigerator, drying clothing on a high heat setting in a clothes dryer, heating an oven to a selected cooking temperature, self-cleaning an oven, and generating steam in a steam appliance. If a cycle of operation in a dishwasher were suspended in response to a demand for energy reduction after a volume of water has already been heated, and during the suspension the water cools, the dishwasher would have to reheat the water again upon resuming the cycle of operation. In such a case, suspending an appliance mid-operation may be less energy efficient and more costly to a user than allowing the appliance to finish its current activity or even the entire cycle of operation.

Figure 2:
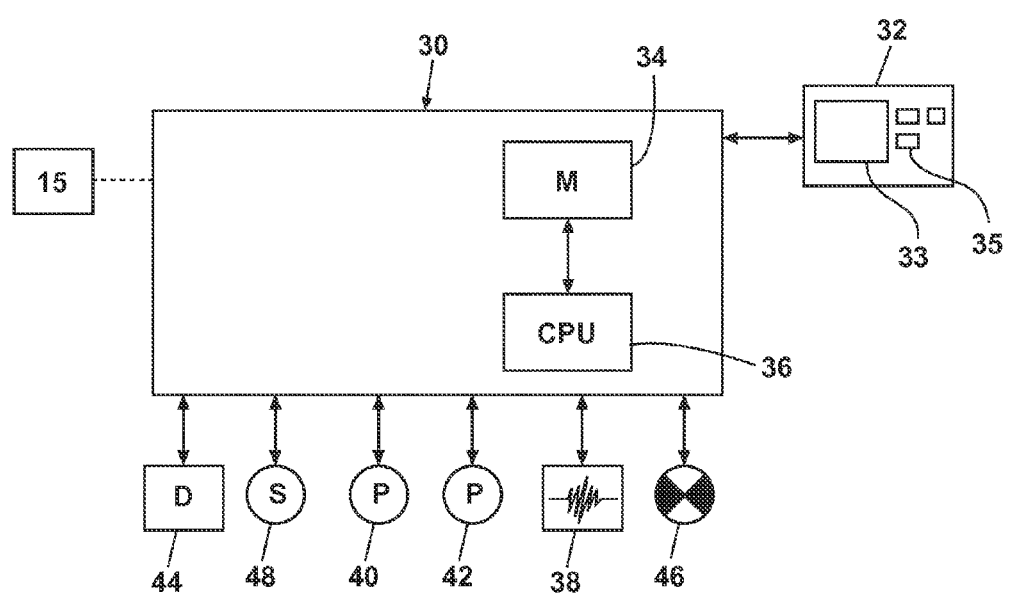
FIG. 2 is a schematic view of a controller of an appliance of FIG. 1.

Referring to FIG. 2, one embodiment of a controller 30 for each of the appliances 11, 12, 13, 14 is illustrated. The controller 30 controls the operation of the appliance to implement one or more cycles of operation. The controller 30 may be located within one or more of the appliances 11, 12, 13, 14, and be operably coupled with a control panel or a user interface 32 for receiving user-selected inputs and communicating information to the user. The user interface 32 may include operational controls such as dials, lights, switches, and displays enabling a user to input commands, such as a cycle of operation, to the controller 30, and receive information. The user interface 32 may, for example, include at least one display 33 and at least one selector or button 35. The display 33 can include lights or other discrete indicators with accompanying text, or a graphical user interface, such as a touch screen. The button 35 can include a push button, switch, or dial on the user interface 32 that a user physically actuates, or a virtual button on a graphical user interface, such the display 33. Alternatively or in addition, the user display 24 may be used as a user interface 32 for the appliance, and may be coupled with the controller 30.

Options may be provided for the user to select or control how the appliance 11, 12, 13, 14 consumes resources and reacts to energy events. Such selections can be made at the appliance 11, 12, 13, 14, the receiver 15, or through the user display 24. For example, the display 33 or button 35 on the user interface 32 of the appliance 11, 12, 13, 14 may be used to activate one of a power saving setting, a money saving setting, and an ignore setting of the appliance 12. The power saving setting may be a setting that a user can select in order to set the controller 30 to automatically take actions that will minimize the amount of power that the appliance 12 consumes. The money saving setting may be a setting that a user can select in order to set the controller 30 to automatically take actions that will minimize the cost of operating the appliance 12 for the user. The user may additionally set the degree to which their preferences are to be asserted. The ignore setting may be a setting that a user can select in order to set the controller 30 to operate without any special regard to the amount of power that the appliance 12 consumes or the cost of operating the appliance 12. Additionally, the user may set the degree to which their preferences may be asserted.

As illustrated in FIG. 2, the controller 30 may be provided with a non-transitory storage medium 34 and a central processing unit (CPU) 36. The non-transitory storage medium 34 may include any suitable computer-readable media, with the sole exception being a transitory, propagating signal, one non-limiting example of which includes a memory. The non-transitory storage medium 34 may be used for storing communication software which is configured to effect communication between the controller 30 and an external network, such as the HAN 20 or the communication network 18. The non-transitory storage medium 34 may also be used for storing control software that is configured to effect one or more cycles of operation by the appliance(s) 11, 12, 13, 14. Examples, without limitation, of cycles of operation in the case of a dishwasher 12 include: Smart Wash, Pots/Pans, Normal Wash, China/Gentle, Fast Wash, and Quick Rinse. The communication and control software can be executed by the CPU 36. The non-transitory storage medium 34 may also be used to store information, such as a database or table, and to store data received from one or more components of the appliance 12 that may be communicably coupled with the controller 30. The database or table may be used to store the various operating parameters for the one or more cycles of operation, including factory default values for the operating parameters and any adjustments to them effected by the control system or by user input.

The controller 30 may be operably coupled with one or more components of the appliance 11, 12, 13, 14 for communicating with and controlling the operation of the component to complete a cycle of operation. For example, in the case of a dishwasher 12, the controller 30 may be operably coupled with a heater 38 for heating wash liquid during a cycle of operation, a drain pump 40 for draining liquid from the treating chamber, a recirculation pump 42 for recirculating wash liquid during a cycle of operation, a dispenser 44 for dispensing a treating agent during a cycle of operation, one or more valve(s) 46 for controlling the flow of liquid or air through the treating chamber, and one or more sensor(s) 48 to control the operation of these and other components to implement one or more of the cycles of operation. Non-limiting examples of a sensor 48 that may be communicably coupled with the controller 30 include a temperature sensor and a turbidity sensor to determine the soil load associated with a selected grouping of dishes, such as the dishes associated with a particular area of the treating chamber. In the case of other types of home appliances, the controller 30 may be operably coupled with components typical to such appliances that are commonly controlled.

The previously described system 10 and one or more appliances 11, 12, 13, 14 provide the structure necessary for the implementation of a method of defining a message to be sent to at least one appliance regarding a schedule for performing a cycle of operation. Embodiments of the method function to determine when an appliance should perform a cycle of operation, based on a projected resource cost. In one embodiment, a projected schedule of delay requests based on pricing data about a resource to be consumed is formed into a message to be transmitted to an appliance. For future time periods where the cost of consumption of the resource is determined to exceed a threshold, a cycle of operation for the appliance may be delayed until the price for the resource decreases below the threshold. In a home or system with multiple appliances, the schedule of delay requests for each appliance can be determined system-wide. Thus, the overall energy bills to the user can be minimized. Additional options can be provided for the user to select or control the threshold used in generating the schedule of delay requests. One embodiment of the method will now be described.

Figure 3:
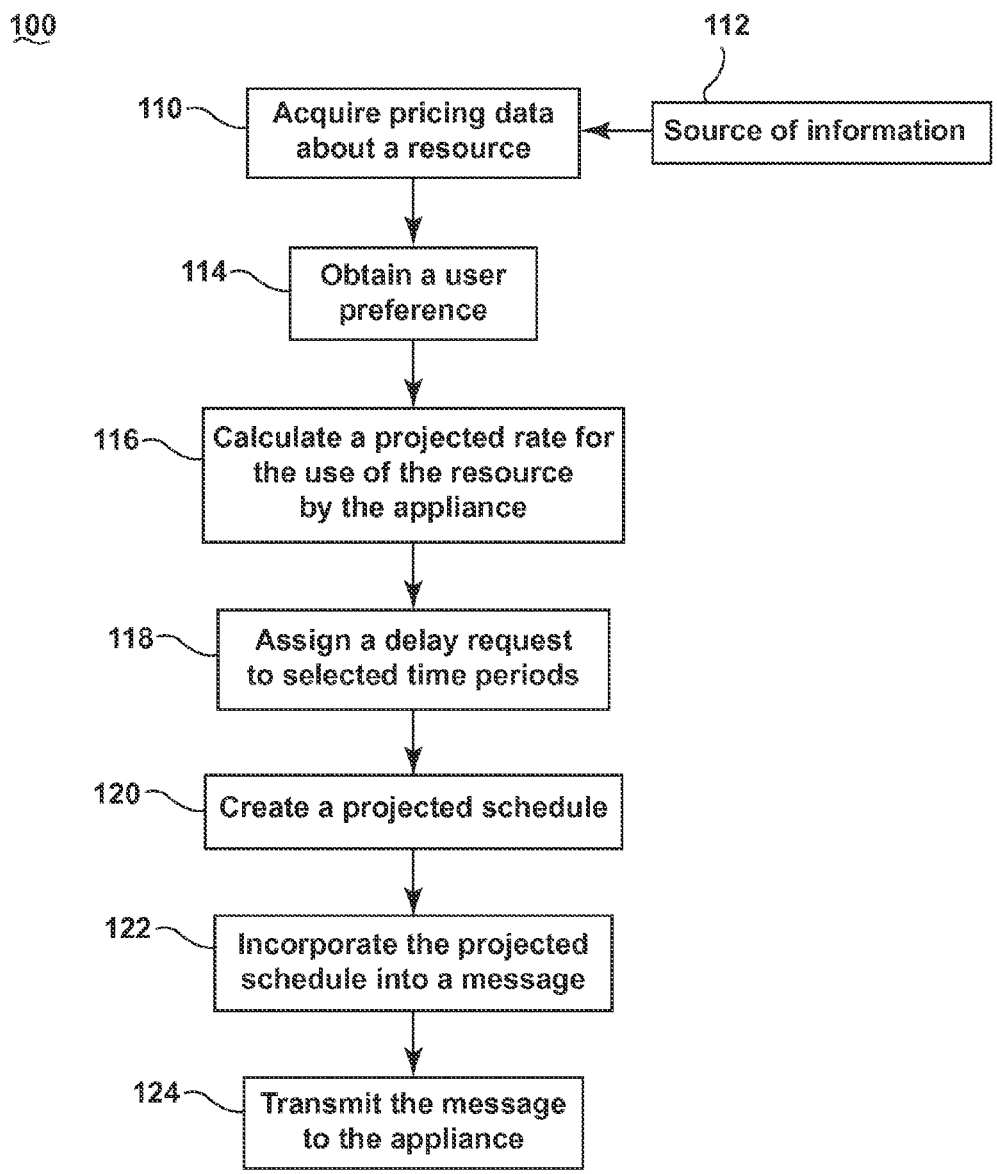
FIG. 3 is a flow chart depicting a first embodiment of a method of defining a message to be sent to at least one appliance regarding a schedule for performing a cycle of operation.

FIG. 3 shows a flow chart depicting a first embodiment of a method 100 of defining a message to be sent to at least one appliance regarding a schedule for performing a cycle of operation. The method 100 may be executed at least in part by the remote device 16 and the resulting message transmitted to the controller 30 of the appliance prior to a cycle of operation of the appliance 12; in other words, before the execution of the control software by the CPU 36. It is understood that the embodiments of the methods shown in the flow chart can be combined in any logical manner. The sequence of steps depicted is for illustrative purposes only and is not meant to limit the method 100 in any way as it is understood that the steps may proceed in a different logical order, additional or intervening steps may be included, or described steps may be divided into multiple steps.

Initially at step 110, the remote device 16 may acquire pricing data from a source of information about a resource consumed by the appliance while performing the cycle of operation. The source of the information 112 may be any data source in communication with the remote device 16 with access to consumer resource rates for resources including, but not limited to, electricity, natural gas and water. Data sources may include the utility provider that may provide, for example, electronic access to a database via a communication network 19 such as the Internet. Alternatively, the remote device 16 may acquire pricing data from a smart meter installed to record a user's energy consumption for purposes of monitoring and billing. A smart meter equipped with advanced metering infrastructure (AMI) may be able to relay pricing data from a utility provider to the remote device 16 via communication network 18. Given the networked resources available to the remote device 16, other sources of information are contemplated whereby the remote device 16 may be configured to gather data related to resource pricing or availability from online data sources. Data sources may include utility rate aggregators and independent system operators. For example, the Midcontinent Independent Transmission System Operator, Inc. (MISO) generates a day-ahead market report for electrical energy rates as well as reports for real-time and historical electrical energy rates.

At step 114, the remote device 16 may obtain a user preference for a factor associated with the use of the resource by the appliance. The user may have previously selected a level of participation whereby they established a profile with a setting indicative of the tradeoff between the user's desire to save money and reluctance to delay a cycle of operation for the appliance. Based on the user's profile setting, the remote device 16 may obtain a factor with a spectrum of ranges, for example from 0 to 1, that quantifies the tradeoff. As described above, the user may make such selections at the appliance 11, 12, 13, 14, the receiver 15, or through the user display 24.

At step 116, the remote device 16 may calculate a projected rate for the use of the resource by the appliance for a future series of time periods. The pricing data acquired in step 110 and the future series of time periods may not be synchronized, potentially requiring the remote device 16 to interpolate and/or extrapolate the acquired pricing data to estimate resource rates for the desired future series of time periods. A number of methods for utility resource price forecasting, particularly for electricity and gas resource markets, have been developed, one or more of which may be implemented for calculating a projected rate for consumable resources. Stationary time series models, such as autoregressive, dynamic regression and transfer function and autoregressive integrated moving average models (ARIMA) have been proposed for projecting resource rates. Also, non-stationary time series models such as the generalized autoregressive conditional heteroscedasticity (GARCH) model and neural networks have been used as well. While the remote device 16 may calculate the projected rates for any future time series, a preferred time series includes one hour time periods for a 24 hour cycle commencing at the following midnight (local time at the location of the one or more appliances).

For example as shown in Table 1, the remote device 16 may calculate projected rates for electricity usage for the subsequent day. Each row of the table is a vector with an element for the start time (formatted in Table 1 on a 24-hour clock) and the projected rate (formatted in Table 1 in units of cost per energy, more specifically, dollars per kilowatt hour).

TABLE 1

| Time | Rate |
| --- | --- |
| 0:00 | 0.02335 |
| 1:00 | 0.02260 |
| 2:00 | 0.02062 |
| 3:00 | 0.02000 |
| 4:00 | 0.01898 |
| 5:00 | 0.02265 |
| 6:00 | 0.02491 |
| 7:00 | 0.02796 |
| 8:00 | 0.04145 |
| 9:00 | 0.03900 |
| 10:00 | 0.02876 |
| 11:00 | 0.02864 |
| 12:00 | 0.02795 |
| 13:00 | 0.02689 |

TABLE 1-continued

| Time  | Rate    |
|-------|---------|
| 14:00 | 0.02889 |
| 15:00 | 0.02450 |
| 16:00 | 0.04353 |
| 17:00 | 0.03774 |
| 18:00 | 0.03755 |
| 19:00 | 0.02977 |
| 20:00 | 0.02692 |
| 21:00 | 0.02890 |
| 22:00 | 0.02548 |
| 23:00 | 0.02270 |

At step 118, the remote device 16 may assign a delay request to selected time periods based on the factor obtained at step 114. To assign a delay request, the remote device 16 may compare the user-selected factor to the projected rate for the use of a resource as calculated in step 116. One way of comparing the factor to the projected rates is by establishing a threshold built upon the average and standard deviation of the projected rates and the factor, whereby the threshold is calculated as the summation of the average of the pricing data and the product of the factor and the standard deviation of the pricing data. The relationship between the quantities is expressed as:

$$\gamma = \mu + \alpha\sigma$$

where $\gamma$ is the threshold, $\mu$ is the average of the series of projected rates, $\alpha$ is the user-selected factor and $\sigma$ is the standard deviation of the series of projected rates. Other calculations may be used to establish the threshold. For example, the distribution of the projected rates for the future series of time periods may be modeled by one of many distribution functions including but not limited to Gaussian, Rayleigh, uniform etc. Based on the model, the threshold may be calculated based on parameters of the distribution function. This may have the effect of augmenting the equation with additive or multiplicative coefficients based on the parameters of the model.

Continuing with the example set forth in Table 1, the average rate for 24 hour cycle is $0.0283/kWh or 2.83 ¢/kWh and the standard deviation is $0.00682/kWh or 0.682 ¢/kWh. The assignment of delay request then depends on the user-selected factor. Table 2 shows possible assignment of delay requests based upon two example factors, 0.1 and 0.9 that result in assignment of delay requests for time periods where the projected rate exceeds $0.0290/kWh or 2.90 ¢/kWh and $0.0345/kWh or 3.45 ¢/kWh, respectively.

| Time  | Rate    | Factor = 0.1  | Factor = 0.9  |
|-------|---------|---------------|---------------|
| 0:00  | 0.02335 |               |               |
| 1:00  | 0.02260 |               |               |
| 2:00  | 0.02062 |               |               |
| 3:00  | 0.02000 |               |               |
| 4:00  | 0.01898 |               |               |
| 5:00  | 0.02265 |               |               |
| 6:00  | 0.02491 |               |               |
| 7:00  | 0.02796 |               |               |
| 8:00  | 0.04145 | DELAY REQUEST | DELAY REQUEST |
| 9:00  | 0.03900 | DELAY REQUEST | DELAY REQUEST |
| 10:00 | 0.02876 |               |               |
| 11:00 | 0.02864 |               |               |
| 12:00 | 0.02795 |               |               |
| 13:00 | 0.02689 |               |               |
| 14:00 | 0.02889 |               |               |
| 15:00 | 0.02450 |               |               |
| 16:00 | 0.04353 | DELAY REQUEST | DELAY REQUEST |
| 17:00 | 0.03774 | DELAY REQUEST | DELAY REQUEST |
| 18:00 | 0.03755 | DELAY REQUEST |               |
| 19:00 | 0.02977 | DELAY REQUEST |               |
| 20:00 | 0.02692 |               |               |
| 21:00 | 0.02890 |               |               |
| 22:00 | 0.02548 |               |               |
| 23:00 | 0.02270 |               |               |

As shown in Table 2, the remote device 16 may assign more delay requests to an appliance where the consumer has indicated a stronger preference to save money (i.e. a user-selected profile with a relatively low valued factor) than to an appliance where the consumer has indicated a reluctance to delay a cycle of operation (i.e. a user-selected profile with a relatively high valued factor). Due to the data driven nature of the assignment of the delay requests, the projected market prices may strongly influence the difference in the number of delay requests assigned to users with different preferences. That is, the variation of the projected rates in the future time series highly correlates to variations in the distribution of delay requests issued to appliances with different user-selected factors. Conversely, relatively flat rates across the future time series will result in the assignment of delay requests that is largely uncorrelated to the user-selected preference. In the extreme, where the projected rates are identically equal for the future time series, the remote device 16 will not assign any delay requests.

At step 120, the remote device 16 may create a projected schedule for performing the cycle of operation for the future series of time periods. The remote device 16 may distill the assigned delay requests to a series of delay request start times and durations. For example, as shown in the third column of Table 2 above, the remote device may create a schedule with two delay requests; a first delay request starting at 8:00 with a duration of two hours and a second delay request starting at 16:00 with a duration four hours. In a second example, as shown in the fourth column of Table 2 above, the remote device may create a schedule with two delay requests; a first delay request starting at 8:00 with a duration of two hours and a second delay request starting at 16:00 with a duration 2 hours.

At step 122, the remote device 16 may incorporate the projected schedule into a message to be sent to the controller 30 of the appliance prior to a cycle of operation. Depending upon the communication network 18 and its associated protocol that the message is to be sent across, the message may additionally contain any of the standard messaging parameters well-known in the art of digital communications. These parameters may include header and routing information for data transfer along nodes of a network. Error correction control may be encoded in the message to ensure integrity of the message.

The schedule may be encoded in the payload of the message and may include additional information that the remote device 16 transmits to the appliance(s) 11, 12, 13, 14. For example, the message, particularly the payload of the message, may include an offset for each delay request in the schedule. The offset may preferably be a random number and ideally encodes a value between 0 and 5 minutes, though other values may be used. In this way, each of the appliances 11, 12, 13, 14 that delay a cycle of operation according to the same schedule of delay requests do not begin or resume the cycle at the same time. Randomly offset commencement of cycles of operation for appliances is known to avoid the deleterious effects related to synchronized loading of a utility, particularly with respect to electrical energy. Finally, at step 124, the remote device 16 may transmit the message to the appliance(s) 11, 12, 13, 14 through the communication network 18 through the system 10 described in FIG. 1.

Figure 4:
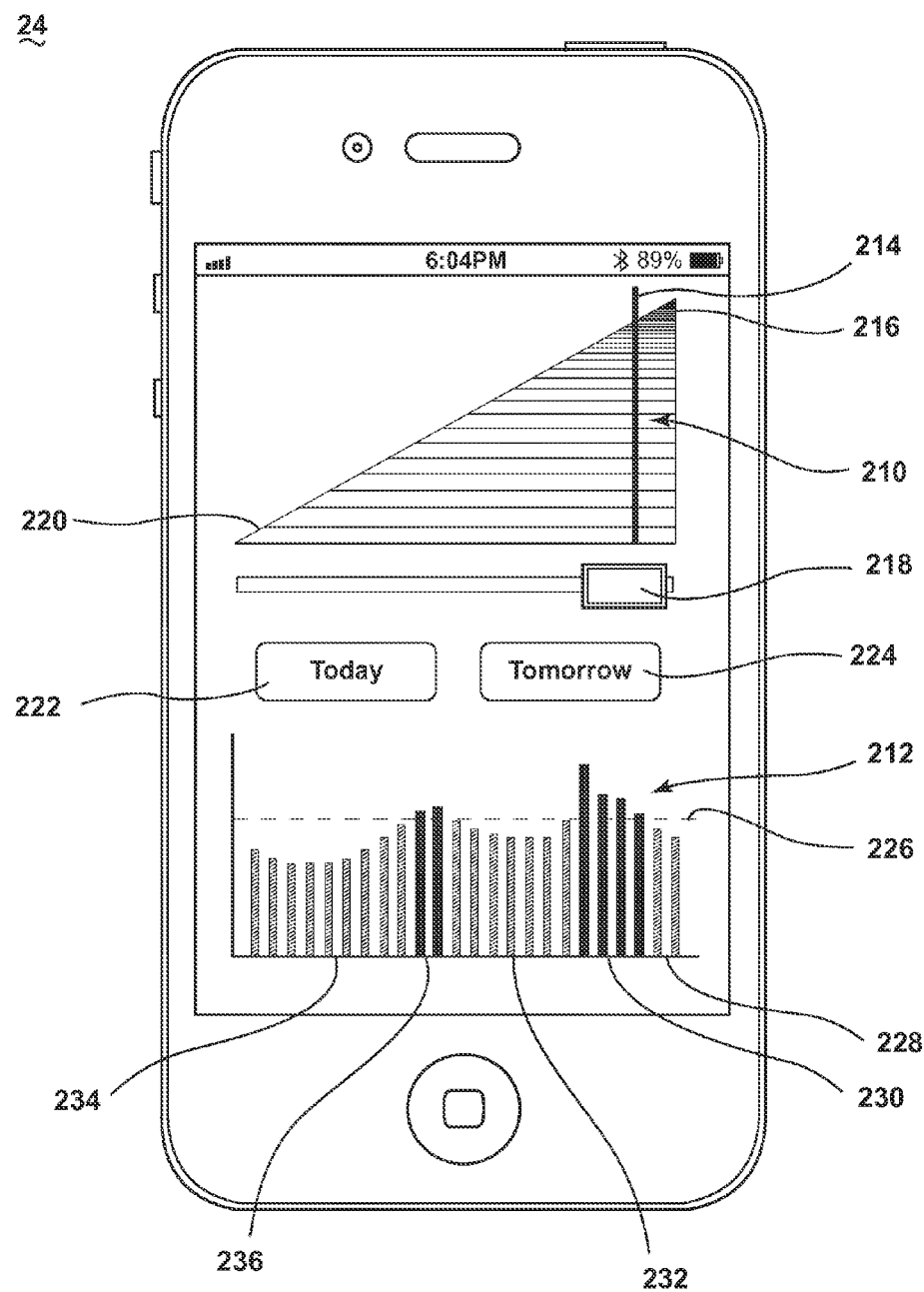
FIG. 4 is a view of a mobile device depicting a user's preference for a level of participation in management of a resource and an optimal schedule for a cycle of operation of an appliance according to an embodiment of the invention.

Referring now to FIG. 4, the user display 24, particularly in a mobile device, may now be described. Though shown in FIG. 4 on a smartphone, the aspects of the interface described applies without limit to a tablet computer, a desktop computer, and a notebook computer and may be applied directly to an interface provided on the appliance(s) 11, 12, 13, 14 or the receiver 15. The user display 24 may allow the user to set the factor used in determining the schedule of delay requests by setting a user control representing the tradeoff between the user's desire to save money and reluctance to delay a cycle of operation for the appliance. For example, a user control 210 may be provided on the user display 24 representing a sliding scale where the user may select one of a range of values. The range of values may have a fine resolution such that the value may smoothly transition from the high point 216 to the low point 220, or may be a set of predetermined values where the user must select one of a limited plurality of levels of participation. As shown, the sliding scale may have a high point 216 and a low point 220 where the user may select any point in between marked by the bar 214. In the example shown, the high point 216 may represent the user's reluctance to delay a cycle of operation and the low point 220 may represent user's desire to save money. The spectrum of values in between the high point 216 and the low point 220 represent the relationship between these two incentives. The user may select a value indicative of their preference by one of any of the conventional methods for selection in graphical controls including, but not limited to, moving a slider 218, touching a touch screen element at the desired point, audio input, etc.

A second user control 212 may provide a display of the scheduled delay requests. The control element 212 graphically represents the schedule presented in TABLE 2. That is, each column represents a time period, for example, one hour. The height of the column represents the price of the consumable resource for the time period. The shading of the column represents whether a delay request has been assigned for the time period. For example, all of the time periods 230, 236 above the pricing threshold 226 are time periods with delay requests. The time periods 228, 232, 234 below the pricing threshold 226 are time periods without delay requests. The time periods 230, 236 represent durations of time where a cycle of operation of an appliance will not begin and, under certain circumstances, may be interrupted if previously commenced. By toggling the buttons 222, 224, the user may view the schedule currently in place (i.e. today's schedule) or the future schedule (i.e. tomorrow's schedule).

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of defining a message to be sent to at least one appliance regarding a schedule for performing a cycle of operation, the method comprising:
    acquiring pricing data from a source of information about a resource consumed by the appliance while performing the cycle of operation;
    obtaining a user preference for a tradeoff factor where the tradeoff factor is indicative of at least one of a user's desire to save money or a user's reluctance to delay a cycle of operation for the appliance;
    calculating at least one projected rate for the use of the resource by the appliance for a future series of time periods to define a series of projected rates:
    assigning a delay request to selected time periods based on the tradeoff factor and the projected rate;
    creating a projected schedule for performing the cycle of operation for the future series of time periods where the projected schedule incorporates the delay request assigned to the selected time periods;
    incorporating the projected schedule into the message;
    and transmitting to the appliance the message so that the appliance performs the cycle of operation based on the projected schedule;
    wherein the tradeoff factor is used to determine a rate threshold above which the delay request is assigned and the rate threshold is a summation of I) an average of the series of projected rates and II) a product of the tradeoff factor and a standard deviation of the series of projected rates.

2. The method of claim 1 wherein the resource is one of electricity, water and natural gas.

3. The method of claim 1 wherein the resource is electricity and the pricing data is cents per kilowatt hour.

4. The method of claim 1 wherein the time periods are one hour each.

5. The method of claim 1 wherein the future series is a 24 hour period.

6. The method of claim 1 wherein the future series commences at a following midnight.

7. The method of claim 1 wherein the source of information is at least one of a smart meter, utility, utility rate aggregator, and an independent system operator.

8. The method of claim 1 wherein the message is to be sent to more than one appliance and the projected schedule includes an offset.

9. A method of scheduling a cycle of operation in an appliance comprising:
    obtaining from a user of the appliance a tradeoff factor between 0 and 1 based on a user's preference for a level of participation in management of a resource;
    determining an optimal schedule for performing a cycle of operation in the appliance wherein the schedule is a function of the tradeoff factor wherein the tradeoff factor is used to determine a rate threshold above which a delay request is included in the optimal schedule, and the rate threshold is a summation of I) an average of a series of projected rates for the use of the resource by the appliance for a future series of time periods and II) a product of the tradeoff factor and a standard deviation of the series of projected rates; and
    performing the cycle of operation in the appliance based on the determined optimal schedule.

10. The method of claim 9 wherein the level of participation is selectable by a user on a sliding scale.

11. The method of claim 9 wherein one of a plurality of predetermined levels of participation are selectable.

12. The method of claim 9 wherein the resource is one of electricity, water and natural gas.

13. The method of claim 9 wherein the resource is electricity.

14. A remote device configured to communicate with at least one appliance regarding a schedule for performing a cycle of operation and to communicate with a source of information about a resource consumed by the appliance while performing the cycle of operation, wherein the remote device comprises at least one server configured to:
- acquire pricing data from the source of information;
- obtain a user preference for a tradeoff factor where the tradeoff factor is indicative of a user's preference for a level of participation in management of a resource;
- calculate at least one projected rate for the use of the resource by the appliance for a future series of time periods to define a series of projected rates;
- assign a delay request to selected time periods based on the tradeoff factor and the projected rate;
- create a projected schedule for performing the cycle of operation for the future series of time periods;
- incorporate the projected schedule into a message; and
- transmit the message to the appliance so that the appliance performs the cycle of operation based on the projected schedule;
- wherein the tradeoff factor is used to determine a rate threshold above which the delay request is included in the projected schedule and the rate threshold is a summation of I) an average of the series of projected rates and II) a product of the tradeoff factor and a standard deviation of the series of projected rates.

15. A non-transitory computer readable storage medium for defining a message to be sent to at least one appliance regarding a schedule for performing a cycle of operation, the non-transitory computer readable storage medium comprising instructions for a server to:
- acquire pricing data from a source of information;
- obtain a tradeoff factor where the tradeoff factor is indicative of a user's preference for a level of participation in management of a resource;
- calculate at least one projected rate for the use of the resource by the appliance for a future series of time periods to define a series of projected rates;
- assign a delay request to selected time periods based on the tradeoff factor and the projected rate;
- create a projected schedule for performing the cycle of operation for the future series of time periods;
- incorporate the projected schedule into a message; and
- transmit the message to the appliance so that the appliance performs the cycle of operation based on the projected schedule;
- wherein the tradeoff factor is used to determine a rate threshold above which the delay request is included in the projected schedule and the rate threshold is a summation of I) an average of the series of projected rates and II) a product of the tradeoff factor and a standard deviation of the series of protected rates.

16. A method of defining a message to be sent to at least one appliance regarding a schedule for performing a cycle of operation, the method comprising:
- acquiring pricing data from a source of information about a resource consumed by the appliance while performing the cycle of operation;
- obtaining a user preference for a tradeoff factor associated with the use of the resource by the appliance;
- calculating at least one projected rate for the use of the resource by the appliance for a future series of time periods to define a series of projected rates;
- assigning a delay request to selected time periods based on the factor and the projected rate;
- creating a projected schedule for performing the cycle of operation for the future series of time periods;
- incorporating the projected schedule into the message; and transmitting to the appliance the message so that the appliance performs the cycle of operation based on the projected schedule;
- wherein the tradeoff factor is used to determine a rate threshold above which the delay request is included in the projected schedule and the rate threshold is a summation of I) an average of the series of projected rates and II) a product of the tradeoff factor and a standard deviation of the pricing data.

17. The method of claim 16 the resource is electricity, the pricing data is cents per kilowatt hour and the delay request is assigned to time periods where the projected rate exceeds the rate threshold.

* * * * *